United States Patent
Ukai et al.

(10) Patent No.: US 11,582,112 B2
(45) Date of Patent: Feb. 14, 2023

(54) ELECTRONIC CONTROL UNIT AND ELECTRONIC CONTROL SYSTEM

(71) Applicant: DENSO CORPORATION, Kariya (JP)

(72) Inventors: Shintaro Ukai, Kariya (JP); Takeshi Sugashima, Kariya (JP); Kazuo Yamaoka, Kariya (JP)

(73) Assignee: DENSO CORPORATION, Kariya (JP)

( * ) Notice: Subject to any disclaimer, the term of this patent is extended or adjusted under 35 U.S.C. 154(b) by 148 days.

(21) Appl. No.: 17/116,641

(22) Filed: Dec. 9, 2020

(65) Prior Publication Data

US 2021/0092025 A1   Mar. 25, 2021

Related U.S. Application Data

(63) Continuation of application No. PCT/JP2019/019866, filed on May 20, 2019.

(30) Foreign Application Priority Data

Jun. 12, 2018   (JP) .............................. JP2018-112285

(51) Int. Cl.
  *H04L 29/06*      (2006.01)
  *H04L 41/147*     (2022.01)
  *H04L 12/40*      (2006.01)

(52) U.S. Cl.
  CPC ...... *H04L 41/147* (2013.01); *H04L 12/40143* (2013.01); *H04L 2012/40215* (2013.01); *H04L 2012/40273* (2013.01)

(58) Field of Classification Search
  CPC ............. H04L 41/147; H04L 12/40143; H04L 2012/40215; H04L 2012/40273; H04L 12/40026; H04L 63/1416; B60R 16/02
  See application file for complete search history.

(56) References Cited

U.S. PATENT DOCUMENTS 9,731,728 B2 * 8/2017 Nguyen Van ....... B60W 50/029
10,173,690 B2 * 1/2019 Mukai ................... B60W 10/06
(Continued)

FOREIGN PATENT DOCUMENTS

JP    H06199154 A    7/1994
JP    2007081484 A    3/2007
(Continued)

OTHER PUBLICATIONS

Qin et al., In-Vehicle CAN Network MessageTampering and Forgery Detection Architecture Based on Data Information Redundancy, Nov. 1, 2017, 2017 International Conference on Information, Communication and Engineering.*

(Continued)

*Primary Examiner* — Jay P Patel
(74) *Attorney, Agent, or Firm* — Harness, Dickey & Pierce, P.L.C.

(57) ABSTRACT

In an electronic control unit, it is determine whether a data frame received from a different electronic control unit via a communication network is abnormal. A prediction data, which is predicted to be a normal data supposed to be included in the data frame determined to be abnormal, is generated by using a past data that is a data included in stored data frames, based on a stored prediction generation method. A prediction data frame including the prediction data is transmitted via the communication network.

23 Claims, 8 Drawing Sheets

(56) References Cited

U.S. PATENT DOCUMENTS

| | | | |
|---|---|---|---|
| 10,479,353 B2* | 11/2019 | Nguyen Van | G01S 13/87 |
| 10,597,030 B2* | 3/2020 | Matsumura | B60W 40/08 |
| 11,352,019 B2* | 6/2022 | Horiguchi | B60W 50/04 |
| 2010/0031106 A1 | 2/2010 | Isoyama | |
| 2016/0101779 A1* | 4/2016 | Katoh | G06V 20/56 |
| | | | 340/435 |
| 2017/0001637 A1* | 1/2017 | Nguyen Van | G01S 13/87 |
| 2017/0225689 A1* | 8/2017 | Mukai | B60W 20/11 |
| 2017/0272451 A1 | 9/2017 | Wakita | |
| 2017/0297566 A1* | 10/2017 | Matsumura | B60W 30/143 |
| 2017/0297567 A1* | 10/2017 | Matsumura | B60W 40/08 |
| 2017/0314479 A1* | 11/2017 | Yamashita | F02D 23/00 |
| 2018/0152475 A1* | 5/2018 | Park | G06N 3/088 |
| 2018/0178784 A1* | 6/2018 | Ohta | G08G 1/166 |
| 2018/0223750 A1* | 8/2018 | Kulkarni | F02M 35/10386 |
| 2018/0316680 A1 | 11/2018 | Kishikawa et al. | |
| 2018/0335774 A1* | 11/2018 | Sato | G05D 1/0248 |
| 2018/0337832 A1* | 11/2018 | Yamashita | H04L 43/062 |
| 2019/0173912 A1 | 6/2019 | Ujiie et al. | |
| 2019/0190792 A1* | 6/2019 | Chen | H04L 43/08 |
| 2019/0204830 A1* | 7/2019 | Ogura | B60W 50/029 |
| 2019/0340116 A1* | 11/2019 | Miyauchi | G06F 11/203 |
| 2020/0070847 A1* | 3/2020 | Horiguchi | B60W 50/04 |

FOREIGN PATENT DOCUMENTS

| | | |
|---|---|---|
| JP | 2017168993 A | 9/2017 |
| JP | 2018011288 A | 1/2018 |
| JP | 2018026791 A | 2/2018 |
| WO | WO-2008126698 A1 | 10/2008 |

OTHER PUBLICATIONS

Kim et al, Validation of CAN-CAN Gateway in the Automotive Network System, Oct. 1, 2017, 17th Internations Conference on Control, Automation and Systems.*

Matsumoto et al., A Method of Preventing Unauthorized Data Transmission in Controller Area Network, May 1, 2012, 2012 IEEE 75th Vehicular Technology Conference (VTC Spring).*

* cited by examiner

FIG. 4

| Frame ID | Signal | Start of Signal Seg | Bit Length Of Signal Seg | Data List | Predict Generate Method |
|---|---|---|---|---|---|
| 1 | Signal A | Data Field at 0th bit in 0th byte | 16 bits | steer angle 1: $a_1$<br>steer angle 2: $a_2$<br>$a_1$ receive time: $t_1$ | $A = a_1 + (a_1 - a_2)/T*(t_0 - t_1)$ |
| 2 | Signal B | Data Field at 0th bit in 0th byte | 16 bits | vehicle speed 1: $b_1$<br>accelerate 1: $c_1$<br>$b_1$ receive time: $t_1$ | $B = b_1 + c_1*(t_0 - t_1)$ |
| 3 | Signal C | Data Field at 0th bit in 0th byte | 8 bits | vehicle info: $c_1$ | $C = c_1$ |
| 4 | Signal D | Data Field at 0th bit in 0th byte | 16 bits | relative speed 1: $vr_1$<br>relative speed 2: $vr_2$<br>$vr_1$ receive time: $t_1$<br>$vr_2$ receive time: $t_2$<br>$a_0$: accelerate<br>R: inter-vehicle distance | $\cdot ar_1 = (vr_1 - vr_2)/(t_1 - t_2)$<br>$\cdot a_1 = a_0 - ar_1$<br>$\cdot ar_0 = g - a_1$<br>$\cdot \Delta t = -vr_1/ar_0$<br>$\cdot R_0 = vr_1*\Delta t + 1/2*ar_0*\Delta t^2$<br>$\cdot R_0 \leq R$ |
| ... | | | | | |

ELECTRONIC CONTROL UNIT AND ELECTRONIC CONTROL SYSTEM

CROSS REFERENCE TO RELATED APPLICATIONS

The present application is a continuation application of International Patent Application No. PCT/JP2019/019866 filed on May 20, 2019, which designated the U.S. and claims the benefit of priority from Japanese Patent Application No. 2018-112285 filed on Jun. 12, 2018. The entire disclosures of all of the above applications are incorporated herein by reference.

TECHNICAL FIELD

The present application relates to a technique for suppressing unauthorized control against an electronic control unit (ECU: Electronic Control Unit) via a network, and is mainly used for an electronic control unit and an electronic control system for a vehicle.

BACKGROUND

In recent years, various types of electronic control units, which are connected to each other via an in-vehicle network such as a CAN (Controller Area Network), are mounted on an automobile. These electronic control units include electronic control units that control the operation of the vehicle, such as the engine and steering wheel. Therefore, in order to ensure the safety of the vehicle, high security is required to prevent the electronic control unit from being incorrectly controlled by an unauthorized access by a third party, or to invalidate the unauthorized control performed by a third party.

SUMMARY

According to an example of the present disclosure, an electronic control unit is provided as follows. In the electronic control unit, it is determine whether a data frame received from a different electronic control unit via a communication network is abnormal. A prediction data, which is predicted to be a normal data supposed to be included in the data frame determined to be abnormal, is generated by using a past data that is a data included in stored data frames, based on a stored prediction generation method. A prediction data frame including the prediction data is transmitted via the communication network.

BRIEF DESCRIPTION OF DRAWINGS

The objects, features, and advantages of the present disclosure will become more apparent from the following detailed description made with reference to the accompanying drawings. In the drawings:

FIG. 4 is a diagram illustrating an example of information list of a generation method storage;

DETAILED DESCRIPTION

Embodiments of the present disclosure will be described below with reference to the drawings. Note that the present disclosure is not limited to the embodiments below. Any effects described in embodiments are effects obtained when a configuration of an embodiment as an example of the present disclosure, and are not necessarily an effect of the present disclosure. When there are a plurality of embodiments, the configuration disclosed in each embodiment is not limited to each embodiment alone, and may be combined across the embodiments. For example, the configuration disclosed in one embodiment may be combined with another embodiment. Further, the disclosed configurations may be collected and combined in each of the plurality of embodiments.

First Embodiment

Figure 1:
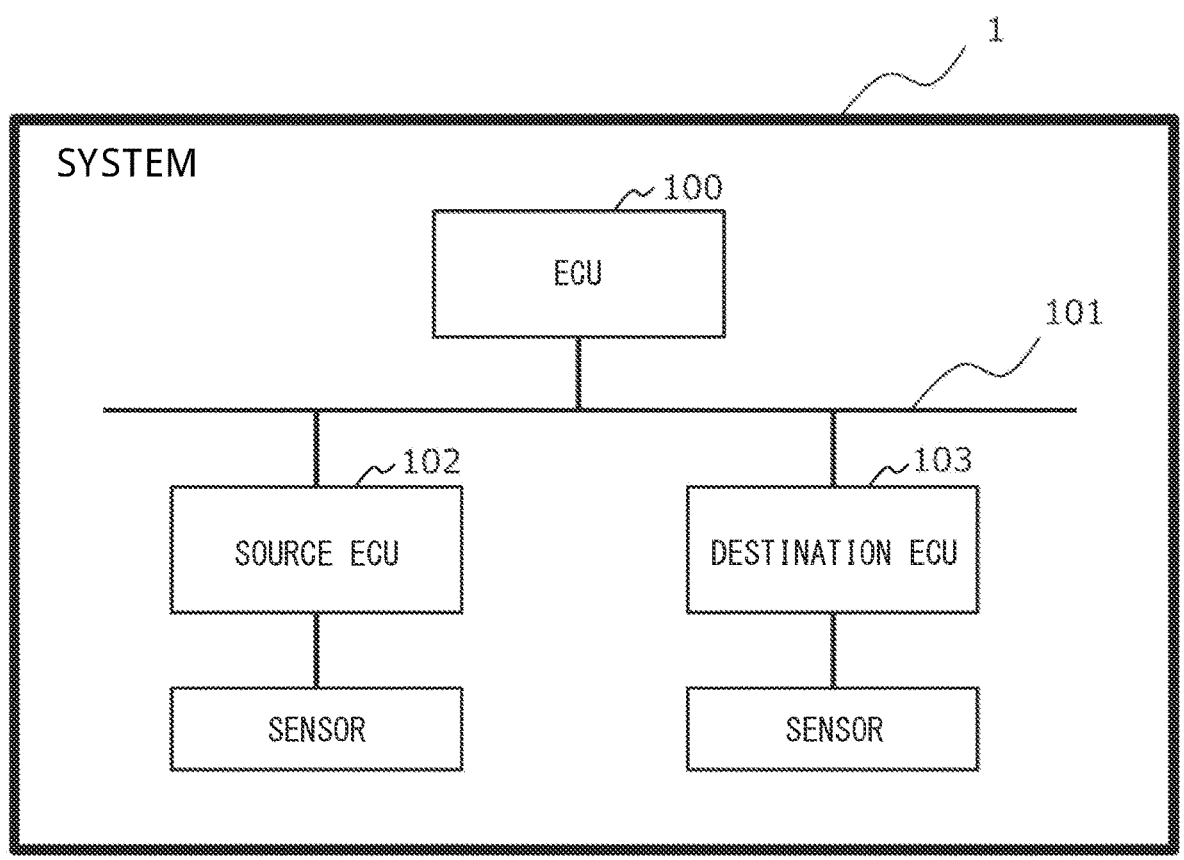
FIG. 1 is a diagram illustrating a configuration of an electronic control system according to a first embodiment.

FIG. 1 shows an electronic control system 1 for a vehicle; the electronic control system 1 includes a plurality of electronic control units. In the electronic control system 1 shown in FIG. 1, a plurality of electronic control units are connected via a communication network 101. In addition to an electronic control unit 100 having functions described in the present embodiment, two electronic control units (a transmission-source electronic control unit 102 and a transmission-destination electronic control unit 103) are provided. Further, the transmission-source electronic control unit 102 and the transmission-destination electronic control unit 103 are respectively connected to respective sensors that detect the states of a host vehicle and surrounding vehicles.

The electronic control units included in the electronic control system 1 transmit and receive data and the like acquired from the sensors, via the communication network 101. The communication network 101 may include optional communication systems such as CAN (Controller Area Network), LIN (Local Interconnect Network), Ethernet (registered trademark), Wi-Fi (registered trademark), and Bluetooth (registered trademark). In the following example, an example using CAN will be described.

The electronic control unit 100 may be configured as, for example, a so-called information processing device that is mainly configured by a semiconductor device and includes a CPU (Central Processing Unit) and a volatile storage such as a RAM (Random Access Memory). In this case, the information processing device may further include a non-volatile storage such as a flash memory, and a network interface unit connected to a communication network. In addition, such an information processing device may be a packaged semiconductor device or a configuration in which respective semiconductor devices are connected by wiring on a wiring board.

In the present embodiment, an example will be described in which the electronic control system 1 includes the electronic control unit 100 as a special-purpose electronic control unit that exhibits the functions described in the present embodiment. In contrast, the electronic control unit 100 does not necessarily have to be a special-purpose electronic control unit; namely, an electronic control unit having another function may be configured to further include the functions described in the present embodiment to thereby function as the electronic control unit 100. Further, a gateway (not shown) includes (i) a relay function of data communication performed between a plurality of communication networks mounted on the vehicle and (ii) a communication function with the outside of the vehicle. Such a gateway may be configured to include the functions of the present embodiment to thereby function as the electronic control unit 100.

Further, FIG. 1 shows an example in which the electronic control system 1 includes only the electronic control unit 100, the transmission-source electronic control unit 102, and the transmission-destination electronic control unit 103. However, it should be understood that the electronic control system 1 may include any number of electronic control units connected via the communication network 101.

1. Configuration of Electronic Control Unit 100

Figure 2:
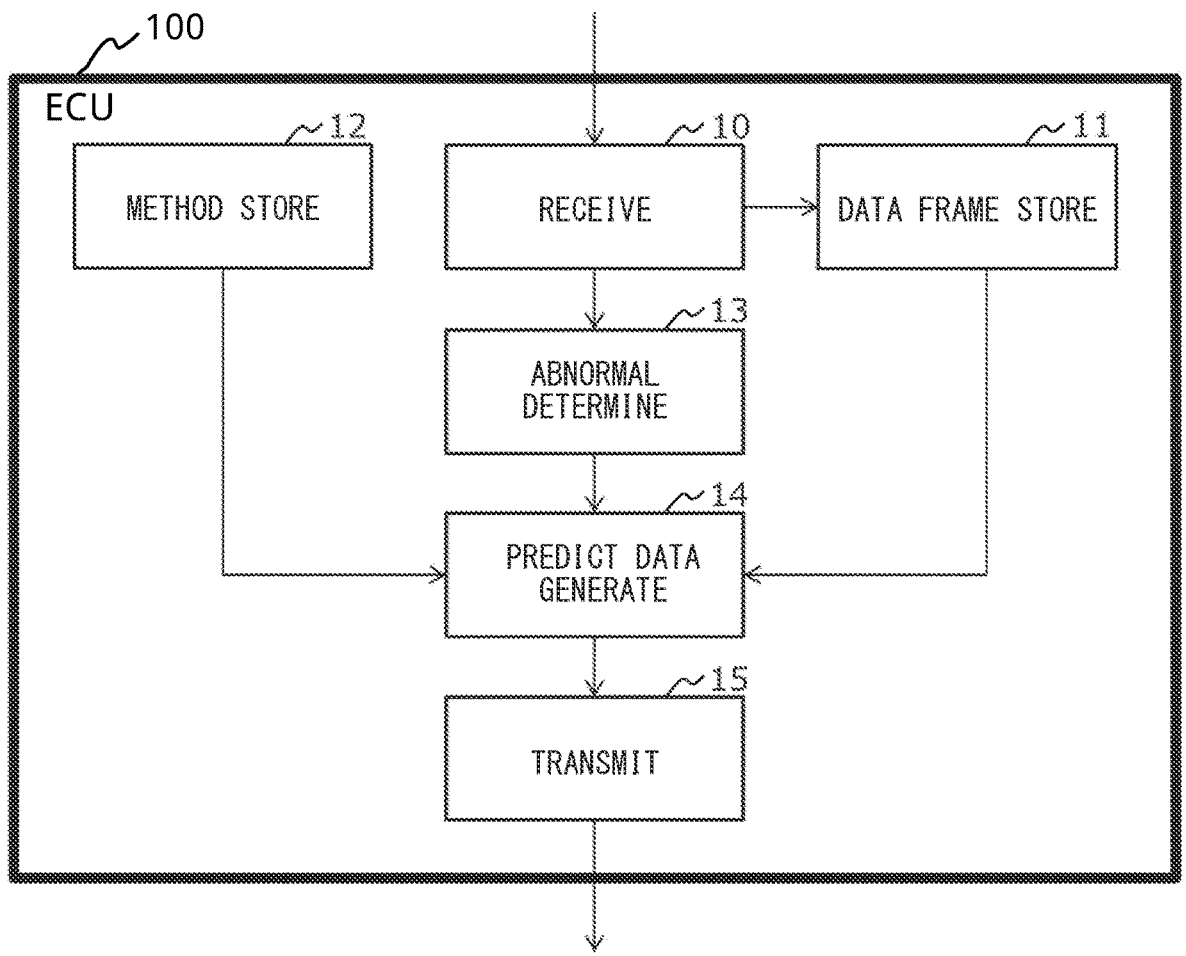
FIG. 2 is a block diagram illustrating a configuration of an electronic control unit according to the first embodiment.

The configuration of the electronic control unit 100 of this embodiment will be described with reference to FIG. 2. The electronic control unit 100 includes a reception unit 10 (which will also be referred to as a receiver 10), a data frame storage 11, a generation method storage 12, an abnormality determination unit 13, a prediction data generation unit 14, and a transmission unit 15 (which will also be referred to as a transmitter 15). Note that, in the present embodiment, an example in which the electronic control unit 100 includes all the elements shown in FIG. 2 will be described. However, the elements shown in FIG. 2 may be provided across a plurality of electronic control units.

The receiver 10 receives a data frame transmitted/received between two or more electronic control units connected via the communication network 101. In the case of the electronic control system 1 shown in FIG. 1, the receiver 10 of the electronic control unit 100 receives data frames transmitted from the transmission-source electronic control unit 102 (corresponding to a different electronic control unit).

Figure 3:
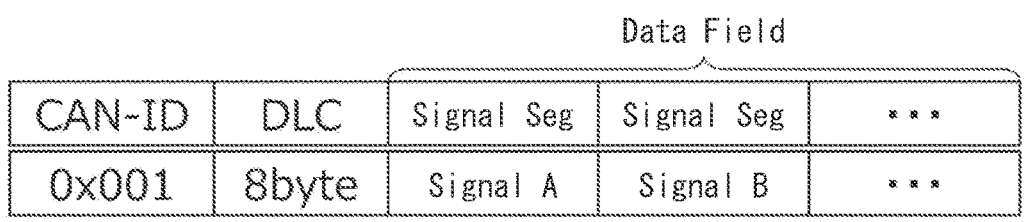
FIG. 3 is a diagram illustrating an example of a format of a data frame.

FIG. 3 shows an example of a format of a data frame transmitted/received via the communication network 101. The data frame shown in FIG. 3 includes (i) an ID field (CAN-ID) having identification information (hereinafter referred to as a frame ID) of a data frame communicated by CAN, (ii) a length field (DLC) indicating the length of the data field, and (iii) a data field having one or more signal segments. Data such as vehicle speed or pressure acquired from a sensor is stored in each signal segment of the data field. The frame ID is specific identification information assigned according to the type of data included in the signal segment. That is, the same frame ID is assigned to the data frames having the same type of data included in the signal segments.

The data frame storage 11 (corresponding to a first storage) stores the data frames received by the receiver 10. The data frame storage 11 may store all the contents included in the data frame received by the receiver 10; alternatively, only a part of the data frame, for example, only the frame ID and the data stored in the signal segment may be stored. The data frame storage 11 may further store the reception time of the data frame by the receiver 10 in association with the data frame. In the present embodiment described below, the data frame storage 11 stores all data frames that are determined not to be abnormal by the abnormality determination unit 13, as described later. However, the data frame storage 11 may store only data frames having a specific frame ID or data stored in a specific signal segment. Further, in order to secure the memory capacity, the data frames may be configured to be stored for a fixed period or a fixed number. Here, "storing a data frame" of the present disclosure includes not only the case of storing the entire data frame but also the case of storing only a part of the contents included in the data frame.

The generation method storage 12 (corresponding to a second storage) stores a method of predicting and generating data included in a data frame (hereinafter, prediction generation method). The prediction generation method is written and stored in advance in the generation method storage 12 before the electronic control unit 100 executes the operation described below. Therefore, the prediction generation method is written by a vehicle manufacturing factory or a manufacturing factory of an electronic control unit before shipping from the factory, or written or updated by a dealer after shipping from the factory, for example.

FIG. 4 shows an example of an information list showing the prediction generation method stored in the generation method storage 12. In FIG. 4, the generation method storage 12 stores, in addition to the prediction generation method, the followings: a frame ID (for example, 0x001 or the like) assigned to the type of prediction data generated by the prediction generation method; information indicating the signal segment in which the prediction data is stored (for example, signal A); a signal segment start point indicating the position of this signal segment in the data frame; a bit length of this signal segment; and a data list required for prediction generation, for example, data used in the prediction generation method and information indicating a storage destination of the data in the data frame storage 11. However, the information list shown in FIG. 4 is merely an example, and the generation method storage 12 may store information other than those shown in FIG. 4.

The abnormality determination unit 13 determines the presence/absence of abnormality in data frame received by the receiver 10. Here, the abnormality of the data frame of the present disclosure includes not only the case where the data frame itself or the contents of the data frame is abnormal, but also the case where the time at which the data frame is transmitted or received is not normal.

The method by which the abnormality determination unit 13 determines whether the data frame is abnormal is optional. As an example, the abnormality determination unit 13 may determine whether the data frame is abnormal based on the reception time of the data frame. For example, some data frames are transmitted from a specific electronic control unit with regular time intervals. For such a data frame, the scheduled reception time of the next data frame can be calculated based on the transmission cycle of the data frame and the reception time at which the receiver 10 received the latest data frame. However, if there is a large discrepancy between the scheduled reception time and the actual reception time of the next data frame, it is highly likely that this data frame was not transmitted normally. Therefore, if the difference between the scheduled reception time and the actual reception time is greater than or equal to a certain value, the abnormality determination unit 13 determines that the data frame received at this reception time is abnormal. Alternatively, even when a plurality of data frames are received near the scheduled reception time, there is a high possibility that some or all of these data frames are abnormal. Therefore, even in such a case, the abnormality determination unit 13 determines that some or all of the plurality of data frames received near the scheduled reception time are abnormal.

The prediction data generation unit 14 generates a prediction data that is predicted as "normal data supposed to be included" in the data frame that is determined to be abnormal, based on the prediction generation method stored in the generation method storage 12. This prediction data is, for example, a normal data that is supposed to be included in the data frame when it is assumed that the data frame determined to be abnormal is transmitted at the predetermined frame transmission time (corresponding to the predetermined transmission time). As shown in FIG. 4, the generation method storage 12 stores a plurality of prediction generation methods in the information list. Therefore, the prediction data generation unit 14 selects a prediction generation method from the information list based on a specific data type such as vehicle speed or pressure included in the data frame determined to be abnormal. A prediction data is then generated based on the selected prediction generation method. This prediction data is generated by the prediction data generation unit 14 by acquiring data (corresponding to a past data) necessary for generating the prediction data from the data frames stored in the data frame storage 11, and performing an operation or the like on these data. In the embodiment shown in FIG. 4, the generation method storage 12 stores a data list indicating data necessary for the prediction generation together with the prediction generation method. Therefore, the prediction data generation unit 14 may read and acquire the data shown in the data list from the data frame storage 11. However, the data list may not be included in the information list stored in the generation method storage 12. In such a case, the prediction data generation unit 14 determines the data necessary for executing this prediction generation method based on the prediction generation method read from the generation method storage 12; then, based on the determination result, necessary data may be acquired from the data frame storage 11. Here, the "normal data supposed to be included" in the data frame of the present disclosure is not limited to the data that should be originally included when the data frame determined to be abnormal is transmitted from the transmission-source electronic control unit. For example, "normal data supposed to be included" also includes data that is predicted/generated in consideration of a difference in transmission-source electronic control unit, a difference in transmission time, or a type or attribute of data to be transmitted. As an example, "normal data supposed to be included" may be a data that is included when the data frame determined to be abnormal is assumed to be transmitted at a time different from the transmission time at which the data frame determined to be abnormal is transmitted from the transmission-source electronic control unit.

The prediction data generation unit 14 further stores the generated prediction data in a predetermined signal segment based on the information of the signal segment shown in the information list of the generation method storage 12. At the same time, the signal segment is arranged at a predetermined position of the data frame based on the information indicating the start point of the signal segment and the information indicating the bit length of the signal. As a result, a prediction data frame including the prediction data is generated. Note that the data frame may have multiple signal segments in the data field. In such a case, the prediction data generation unit 14 generates the prediction data to be stored in each of the plurality of signal segments based on each prediction generation method. Then, the generated prediction data is stored in each signal segment, and each signal segment is arranged at a predetermined position to generate a prediction data frame.

The transmitter 15 transmits the prediction data frame generated by the prediction data generation unit 14. In addition, the prediction data generation unit 14 may generate a normal data that is supposed to be included in a data frame on the assumption that the prediction data is transmitted at a predetermined frame transmission time. In such a case, the transmitter 15 transmits the prediction data frame at the predetermined frame transmission time. Here, the frame transmission time is a time obtained by adding the time required to generate and transmit the prediction data frame to the time when it is determined that the data frame is abnormal. For example, the frame transmission time is the time when the prediction data frame including the prediction data can be transmitted without delay after the prediction data is generated. However, in addition to this, it may be the time after a predetermined wait is inserted after the prediction data is generated. That is, the predetermined transmission time corresponds to the time lag after the abnormality is detected until the electronic control unit 100 transmits the prediction data frame. Depending on the processing speed of the electronic control unit 100, the frame transmission time and the time when it is determined that there is an abnormality may be evaluated to be substantially the same time. Note that the time of abnormality detection is approximately the same as the time at which a different electronic control unit transmits the data frame.

2. Operation of Electronic Control Unit 100

Figure 5:
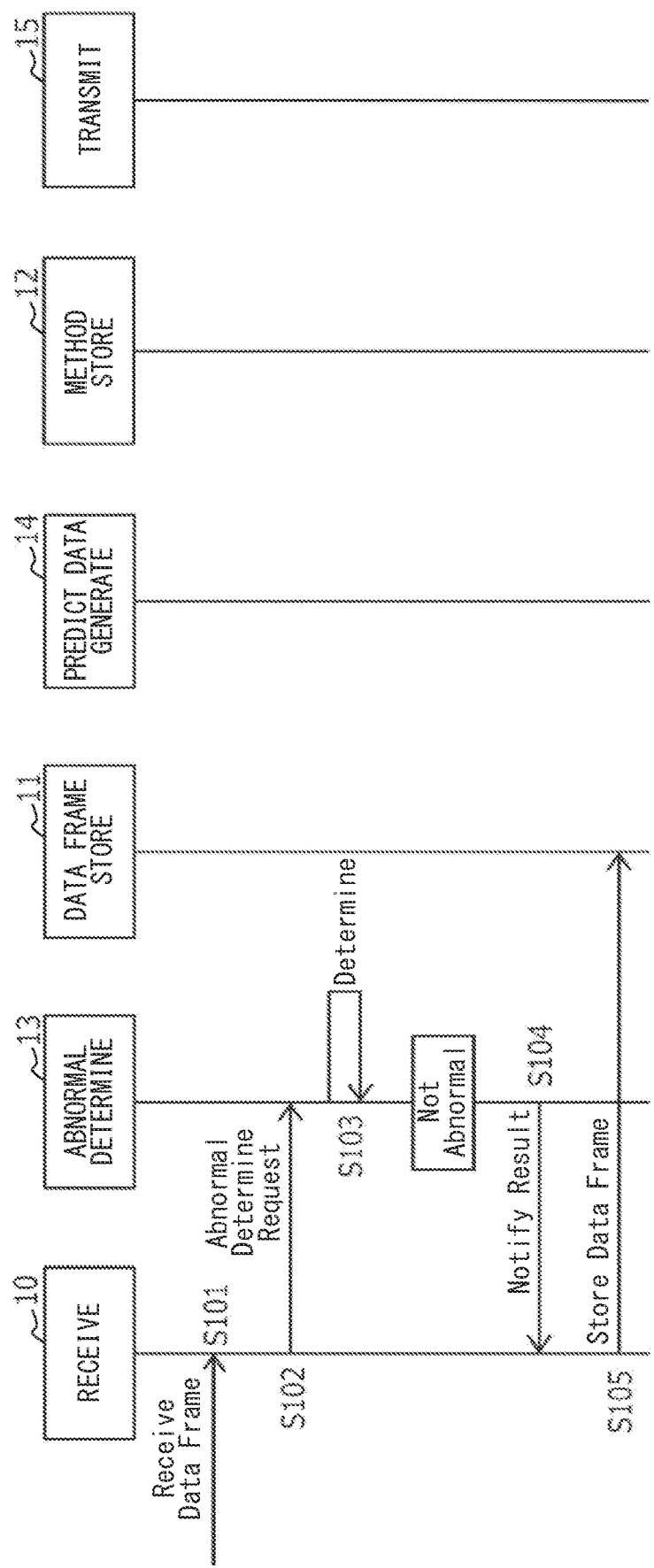
FIG. 5 is a diagram illustrating an operation of the electronic control unit according to the first embodiment.
Figure 6:
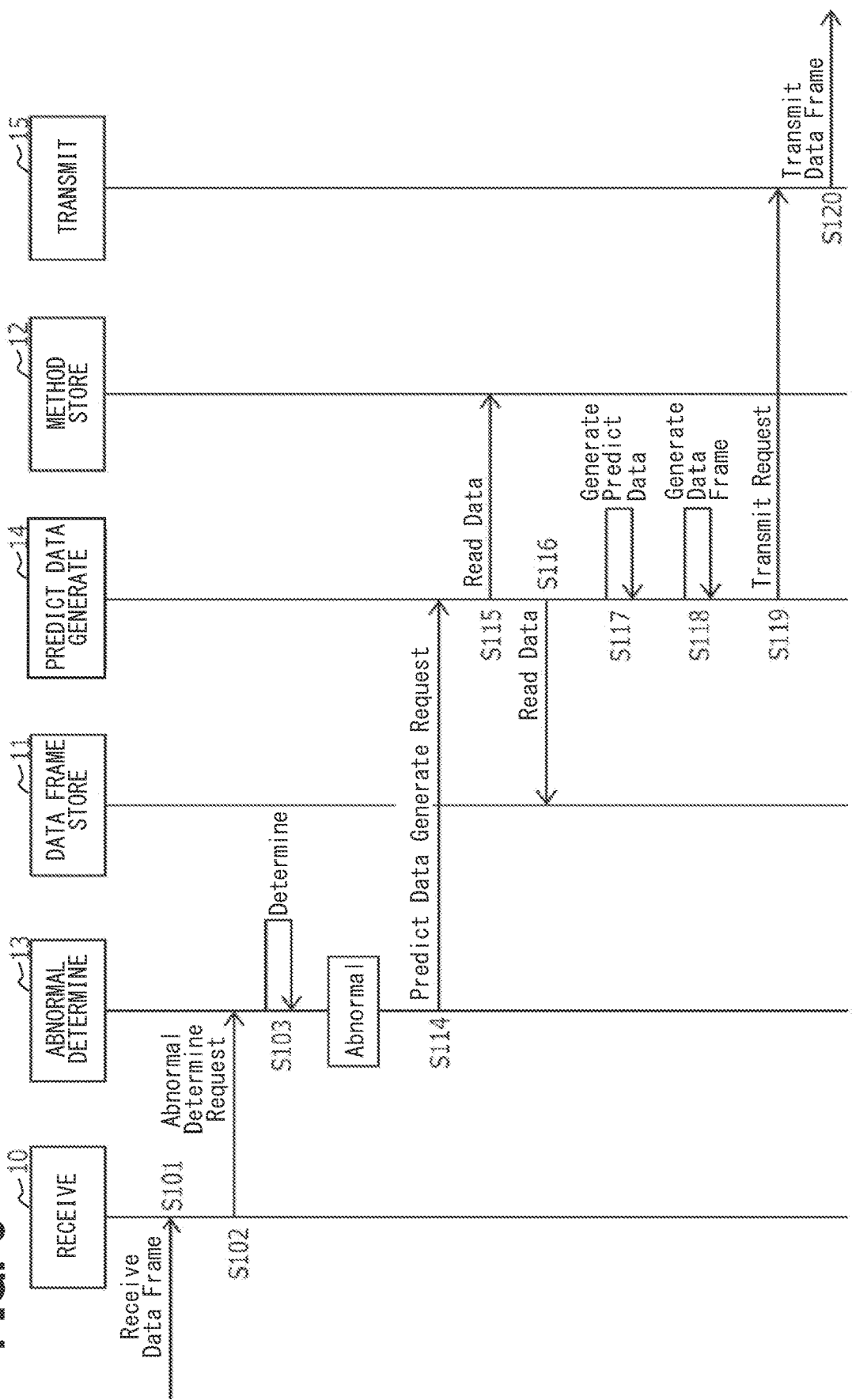
FIG. 6 is a diagram illustrating an operation of the electronic control unit according to the first embodiment.

Next, the operation of the electronic control unit 100 will be described with reference to FIGS. 5 and 6. FIG. 5 shows the operation when there is no abnormality in the data frame received by the receiver 10; FIG. 6 shows the operation when there is an abnormality in the data frame.

The receiver 10 receives a data frame transmitted/received between the electronic control units connected via the communication network 101 (S101). Upon receiving the data frame, the receiver 10 requests the abnormality determination unit 13 to determine whether the received data frame has an abnormality (S102). At this time, the receiver 10 may notify the abnormality determination unit 13 of the received data frame and its reception time together with the abnormality determination request. Then, the abnormality determination unit 13 that has received the request in S102 determines whether the received data frame is abnormal (S103).

When it is determined that the data frame is not abnormal as shown in FIG. 5, the abnormality determination unit 13 notifies the receiver 10 of the determination result indicating that the data frame is not abnormal (S104). Then, the receiver 10 stores the data frame received in S101 in the data frame storage 11 (S105). Note that in the embodiment shown in FIG. 5, only the data frames determined to be not abnormal are stored in the data frame storage 11, but all the data frames received by the receiver 10 may be stored in the data frame storage 11.

On the other hand, as shown in FIG. 6, it is determined that the data frame is abnormal as a result of determining whether the data frame is abnormal in S103. In this case, the abnormality determination unit 13 requests the prediction data generation unit 14 to generate a prediction data (S114). At this time, the abnormality determination unit 13 may notify the prediction data generation unit 14 of the frame ID of the data frame determined to be abnormal, the frame reception time, the data included in the data frame, and the like.

The prediction data generation unit 14 receives the prediction data generation request from the abnormality determination unit 13. The prediction data generation unit 14 then reads out a prediction generation method, a data list indicating data necessary for prediction generation, and the like from the information list stored in the generation method storage 12, based on the data included in the data frame determined to be abnormal (S115).

At this time, the prediction data generation unit 14 may select and read out the prediction generation method corresponding to the data included in the data frame determined to be abnormal using the frame ID assigned according to the type of data. For example, when the frame ID of the data frame determined to be abnormal is "0x001", the data in the first row is read from the information list shown in FIG. 4. When the frame ID is "0x002", the data in the second row and the data in the third row are read out from the information list shown in FIG. 4.

In S115, the prediction data generation unit 14 reads out the prediction generation method and the like from the information list of the generation method storage 12. The prediction data generation unit 14 then reads the data necessary for executing the read prediction generation method from the data frame storage 11 (S116).

Next, the prediction data generation unit 14 generates a prediction data using the data (corresponding to a past data) read from the data frame storage 11 based on the prediction generation method read in S115 (S117). The prediction data generation unit 14 further generates a prediction data frame including the generated prediction data (S118).

Then, the prediction data generation unit 14 requests the transmitter 15 to transmit the generated prediction data frame (S119). Upon receiving the transmission request from the prediction data generation unit 14, the transmitter 15 transmits the prediction data frame (S120).

The transmission-destination electronic control unit 103 receives the same data frame as the data frame received by the receiver 10 in S101, and then receives the prediction data frame transmitted from the transmitter 15 in S120. The transmission-destination electronic control unit 103 reads out the latest one from the received data frames by LIFO control, controlling based on the data included in the data frame. That is, suppose a case where the transmission-destination electronic control unit 103 receives the prediction data frame transmitted from the transmitter 15 in S120 before being controlled by the previously received data frame. The transmission-destination electronic control unit 103 is controlled by this prediction data frame.

3. Generation of Prediction Data Based on Prediction Generation Method

Next, the prediction generation method stored in the generation method storage 12 will be exemplified, and a specific prediction data generation method will be described. The prediction generation method shown below is merely a representative example, and the prediction generation method used in the present embodiment is not limited to the example shown below.

(a) Generation of Prediction Data Predicted from Data of the Same Type as that of Abnormal Data The following will describe a method of generating a prediction data predicted from data of the same type as that of the abnormal data included in the data frame determined to be abnormal among the data stored in the data frame storage 11.

For example, when the abnormal data is a data on steering angle of the vehicle, the prediction data A is generated using the data on the past steering angle based on the prediction generation method shown in the following Expression (1).

$$A = a_1 + (a_1 - a_2)/T \times (t_0 - t_1) \quad (1)$$

Here, $a_1$ is the first latest data regarding the steering angle included in the data frame stored in the data frame storage 11; $a_2$ is the second latest data, which precedes $a_1$, regarding the steering angle included in the data frame stored in the data frame storage 11. T is a transmission cycle of a data frame including data on steering angle. Further, $t_0$ is a scheduled transmission time at which the data frame generated by the prediction data generation unit 14 is scheduled to be transmitted from the transmitter 15. $t_1$ is the reception time when the receiver 10 receives the data frame including $a_1$. The scheduled transmission time $t_0$ can be calculated by adding the reception time of the data frame determined to be abnormal and the time required to generate and transmit the data frame including the prediction data.

Note that the generation method storage 12 stores the data list necessary for the prediction generation. In the above example, as shown in the first row of the information list shown in FIG. 4, $a_1$, $a_2$, and $t_1$ are described in the data list. The prediction data generation unit 14 reads these data from the data frame storage 11 and generates the prediction data A based on Expression (1).

Figure 7:
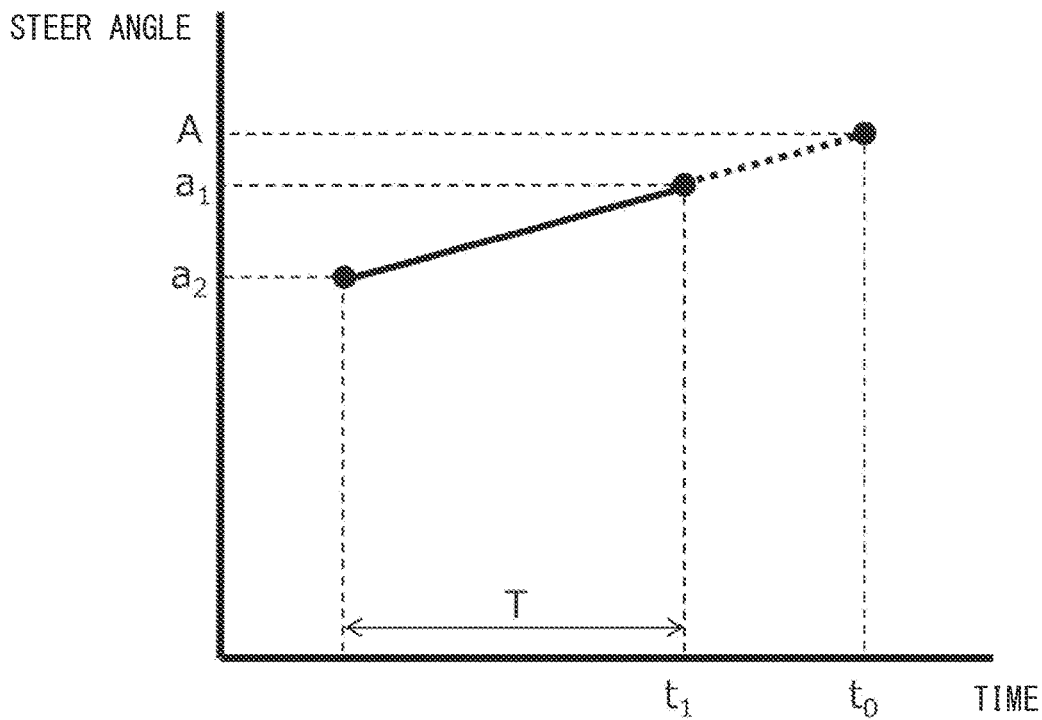
FIG. 7 is a diagram illustrating a prediction data generation method.

FIG. 7 is a diagram illustrating this prediction generation method. In a known technology, the content of the data frame for invalidating the unauthorized frame is the same as the data frame received immediately before. Therefore, the electronic control unit will transmit the data of $a_1$ at the scheduled transmission time $t_0$. However, considering that the steering angle increases with time from $a_2$ to $a_1$, as shown by the broken line in FIG. 7, the steering angle at the scheduled transmission time $t_0$ is more likely to increase to more than $a_1$. Therefore, the steering angle at the scheduled transmission time $t_0$ is predicted based on the prediction generation method shown in Expression (1), and the prediction data A is generated.

For example, the prediction data A of the steering angle will be calculated under the following conditions: the steering angle $a_1$ stored in the data frame storage 11 is 30.0°; the reception time t1 of the steering angle $a_1$ is 10.00 seconds; the steering angle $a_2$ is 29.0°; the data frame transmission period T is 1.0 second; the reception time of the data frame determined to be abnormal is 10.05 seconds; and the time required to transmit a data frame is 0.05 seconds. In this case, the prediction data A of the steering angle is calculated to be 30.1° based on Expression (1). Therefore, the transmitter 15 transmits the prediction data frame including the generated prediction data of 30.1° at the scheduled transmission time of 10.10 seconds (10.05+0.05 seconds).

In another example, the prediction data may be generated based on an average of data of the same type as that of the abnormal data among the data stored in the data frame storage 11. For example, the lighting state of a fog lamp of a vehicle typically does not change frequently. Assume that an abnormal data frame or a data estimated to be included in a data frame determined to be abnormal was transmitted at a specified frame transmission time. Under such assumption, it is highly possible that all normal data supposed to be included in the data frame are the same as the lighting state of the fog lamp in the past. Therefore, when the abnormal data included in the data frame determined to be abnormal is data indicating the lighting state of the fog lamp of the vehicle, the prediction data is generated from the average of data indicating the past lighting state of the fog lamp. Specifically, suppose a case, the data frame storage 11 stores ten pieces of data indicating past lighting states of fog lamps, nine pieces of which indicate lighting of the fog lamp and one piece of which indicates non-lighting of the fog lamp. Under such a case, the prediction data generation unit 14 generates, as the prediction data, data indicating lighting of the fog lamp, which is the average data or higher.

(b) Generation of Prediction Data Predicted from Data of a Type Different from that of Abnormal Data In (a), the prediction data predicted from the same type of data as that of the abnormal data is generated, but the prediction data predicted from the data of a different type from that of the abnormal data may be generated.

For example, when the abnormal data is data related to the vehicle speed, the prediction data B is generated using the past vehicle speed data and the data other than the vehicle speed based on the prediction generation method shown in the following Expression (2).

$$B = b_1 + c_1 \times (t_0 - t_1) \qquad (2)$$

Here, $b_1$ is the latest data regarding the vehicle speed stored in the data frame storage 11, and $c_1$ is the latest data regarding the acceleration stored in the data frame storage 11. Further, $t_1$ is the reception time when the receiver 10 receives the data frame including $b_1$.

In addition, when the generation method storage 12 stores a data list necessary for prediction generation, $b_1$, $c_1$, and $t_1$ are included in the data list as shown in the second row of the information list shown in FIG. 4. The prediction data generation unit 14 reads out these data from the data frame storage 11 and generates the prediction data B based on Expression (2).

For example, the predicted vehicle speed data B will be calculated under the following conditions: the vehicle speed $b_1$ stored in the data frame storage 11 is 30.0 km/h; the reception time $t_1$ of $b_1$ is 10.00 seconds; the acceleration $c_1$ is 1.0 m/s2; the reception time of the data frame determined to be abnormal is 10.05 seconds; and the time required to transmit a data frame is 0.05 seconds. In this case, the predicted vehicle speed data B is calculated as 30.36 km/h based on Expression (2). Therefore, the transmitter 15 transmits the prediction data frame including the prediction data of 30.36 km/h at the transmission time of 10.10 seconds.

In the above example, when the abnormal data is data related to the vehicle speed, the prediction data is generated using data other than the vehicle speed (for example, acceleration data) in addition to the past vehicle speed data. In contrast, as described below, the prediction data may be generated using only the data of a type completely different from that of the abnormal data.

Figure 8:
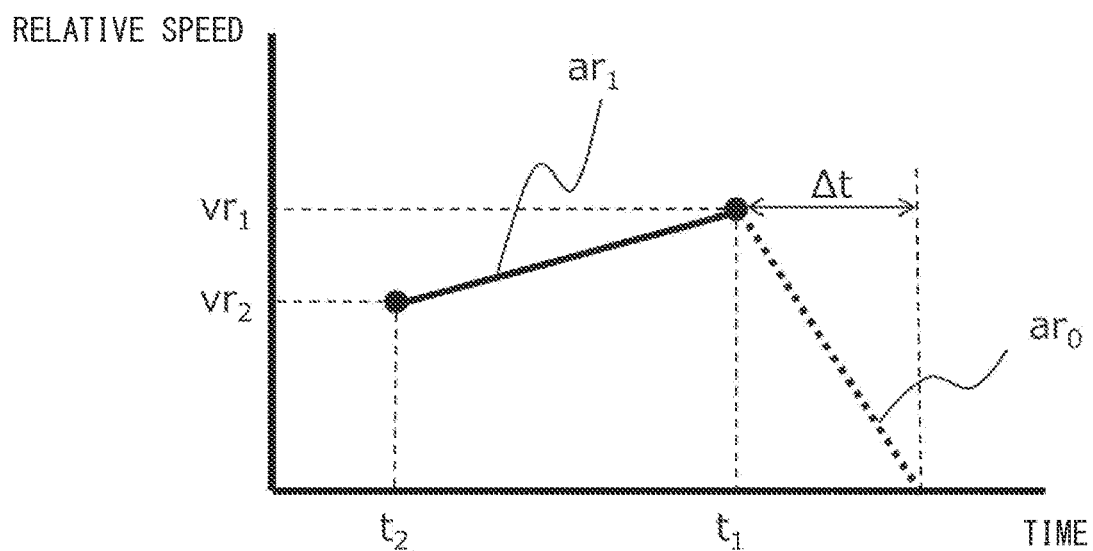
FIG. 8 is a diagram illustrating a prediction data generation method.

For example, in a vehicle equipped with a driving support system, a brake request is generated by determining compositely a plurality of factors such as the speed of the host vehicle, the speed of a vehicle traveling in front of the host vehicle (hereinafter referred to as the "front vehicle"), and the inter-vehicle distance to the front vehicle. Therefore, when the abnormal data is data related to the brake request, it is desirable to use the data that is completely different from the data related to the past brake request to generate the prediction data. The following will describe an example of a prediction generation method of prediction data which is a brake request. FIG. 8 is a diagram illustrating this prediction generation method.

The prediction data generation unit 14 executes the following Expressions (3) to (8) to generate prediction data.

First, the relative acceleration an of the host vehicle with respect to the front vehicle is calculated according to the following Expression (3).

$$ar_1 = (vr_1 - vr_2)/(t_1 - t_2) \qquad (3)$$

Here, $vr_1$ is the (first) latest data regarding the relative speed with respect to the front vehicle stored in the data frame storage 11: $vr_2$ is the second latest data, which precedes $vr_1$, regarding the relative speed with respect to the front vehicle stored in the data frame storage 11. Further, $t_1$ and $t_2$ are the reception times of $vr_1$ and $vr_2$ in the receiver 10, respectively. Note that an corresponds to the rate of change of the relative speed between $t_1$ and $t_2$, as shown in FIG. 8.

The following will calculate the acceleration a1 of the front vehicle using the relative acceleration an calculated by Expression (3) from the following Expression (4).

$$a1 = a0 - ar_1 \qquad (4)$$

Here, a0 is data regarding the acceleration of the host vehicle stored in the data frame storage 11.

Next, the relative acceleration $ar_0$ of the host vehicle with respect to the front vehicle at the time of emergency braking is calculated based on Expression (5) by using the acceleration a1 of the front vehicle calculated by the equation (4) and the acceleration g when the emergency brake is applied.

$$ar_0 = g - a1 \qquad (5)$$

Note that $ar_0$ corresponds to the rate of change of the relative speed after t1, as shown in FIG. 8.

Further, Expression (6) is calculated using the relative speed $vr_1$ used in Expression (3) and the relative acceleration $ar_0$ during emergency braking calculated in Expression (5). Thereby, the time Δt required until the relative speed of the host vehicle to the front vehicle becomes 0, that is, the speeds of the front vehicle and the host vehicle become equal when the emergency brake is applied.

$$\Delta t = -vr_1/ar_0 \qquad (6)$$

Next, a predicted braking distance R0 predicted to be required until the relative speed of the host vehicle to the front vehicle becomes 0 when the emergency brake is applied is calculated based on the equation (7), by using the relative acceleration $ar_0$ of the host vehicle with respect to the front vehicle when the emergency brake is applied, calculated by Expression (5), and the time Δt calculated by Expression (6).

$$R0 = vr_1 \times \Delta t + \tfrac{1}{2} \times ar_0 \times \Delta t^2 \qquad (7)$$

Here, the predicted braking distance R0 obtained by Expression (7) is compared with the actual inter-vehicle distance R between the front vehicle and the host vehicle stored in the data frame storage 11. Here, when the predicted braking distance R0 is larger than the actual inter-vehicle distance R, the relative speed of the host vehicle to the front vehicle becomes 0. The host vehicle may collide with the front vehicle before the speeds of the front vehicle and the host vehicle become equal. Therefore, in the case of R0>R, the prediction data generation unit 14 generates, as the prediction data, data indicating that there is a brake request. On the other hand, as a result of the above series of calculations, when R0⇐R, the inter-vehicle distance between the front vehicle and the host vehicle can be sufficiently secured when the speeds of the front vehicle and the host vehicle become equal. Therefore, the prediction data generation unit 14 generates, as the prediction data, data indicating that there is no brake request. Assume that the data that may be included in the data frame determined to be abnormal or the abnormal data frame is transmitted at a predetermined frame transmission time. In such an assumption, data indicating the presence/absence of a brake request is transmitted as normal data supposed to be included in the data frame.

The above example has described an example in which the steering angle, the lighting state of the fog lamp, the vehicle speed, and the brake request are generated as the prediction data. However, the types of data described above are merely examples, and optional data can be generated as prediction data. For example, the engine speed, which can change its numerical value continuously such as the vehicle speed, may be generated as a prediction data. Alternatively, for example, data indicating ON/OFF of ACC (Adaptive Cruise Control) may be generated as a prediction data as the data represented by the discrete value like the lighting state of the fog lamp. Also, the vehicle speed is shown as an example of a prediction generation method using data of a type different from that of the abnormal data. However, in order to generate the prediction data of the vehicle speed, the acceleration data may not be used, and only the past vehicle speed data may be used.

Furthermore, the above example has described (i) the prediction generation method based on the assumption that the data changes linearly and (ii) the prediction generation method using the average. However, the prediction generation method of this embodiment is not limited to the exemplified method, and any method can be used. For example, the prediction data may be generated by the least square method using a plurality of data stored in the data frame storage 11.

Further, in the present embodiment, it is sufficient that the data frame transmitted from the transmitter 15 includes the prediction data generated based on the prediction generation method, and data other than the prediction data may be included. For example, since the vehicle identification information does not change over time, such a constant data is always stored in the signal segment in which the vehicle identification information is stored. In such a case, the prediction data generation unit 14 stores the prediction data generated based on the prediction generation method of this embodiment in the signal segment A, and stores data such as vehicle identification information that is different from the prediction data generated based on the prediction generation method in the signal segment B. A data frame is thus generated.

For example, the prediction data generation unit 14 may store the vehicle identification information in the memory and add the stored vehicle identification information to the generated prediction data to generate the prediction data frame. Alternatively, even constant data such as vehicle identification information may be generated using the same method as the prediction data of the present embodiment. In this case, as shown in the third row of the information list shown in FIG. 4, the generation method storage 12 stores the prediction generation method of C=c1. Here, c1 is the latest data regarding the vehicle identification information stored in the data frame storage 11. That is, as for data such as vehicle identification information, the same value as the latest data stored in the data frame storage 11 is always stored in the signal segment. Then, the prediction data generation unit 14 generates a prediction data frame by combining the signal segment that stores the prediction data generated based on the predicted generation method and the signal segment that always stores constant data such as vehicle identification information.

According to the first embodiment, the data included in the data frame that invalidates the unauthorized frame is set as the prediction data of the normal data that should be included in the data frame. This makes it possible to properly control the transmission-destination electronic control unit. Furthermore, the prediction data is used as the data at the transmission time of the data frame. This makes it possible to control the transmission-destination electronic control unit with information suitable for the state at the time of transmission, even for data that changes over time.

Second Embodiment

In the above-described first embodiment, the prediction data generation unit 14 is configured to generate prediction data mainly for the data frame stored in the data frame storage 11. In contrast, the prediction data generation unit 14 may further acquire data directly from a sensor or the like connected to the electronic control unit 100, and use this data to generate a prediction data.

Figure 9:
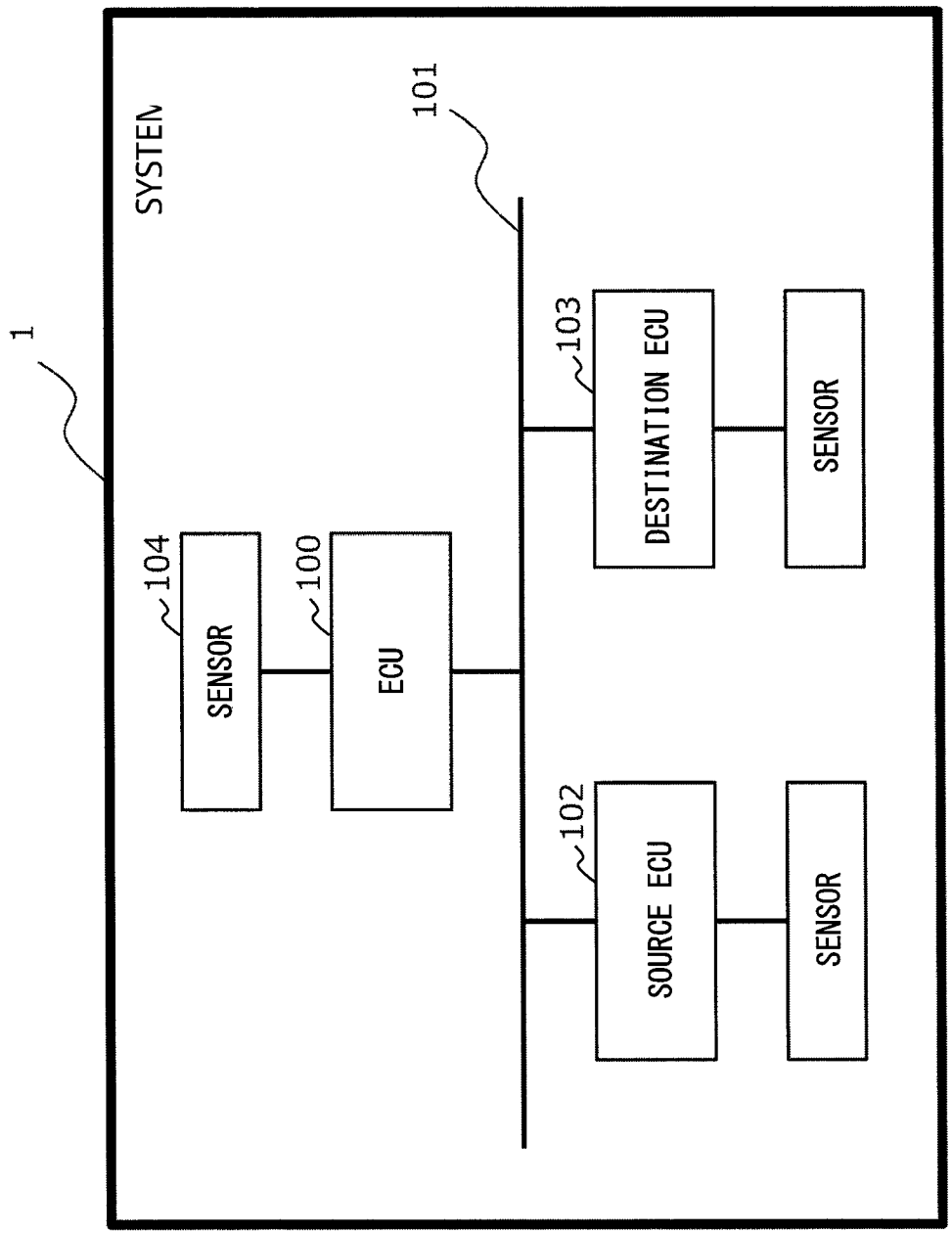
FIG. 9 is a diagram illustrating a configuration of an electronic control system according to a second embodiment.

FIG. 9 shows the electronic control system of this embodiment. Unlike the electronic control system shown in FIG. 1, a sensor (corresponding to a sensor device) 104 is connected to the electronic control unit 100. Note that, in FIG. 9, only the sensor 104 is connected to the electronic control unit 100, but it goes without saying that the electronic control unit 100 may be connected to a plurality of sensors. Further, the electronic control unit 100 may be connected to a sensor connected to the transmission-source electronic control unit 102 and/or the transmission-destination electronic control unit 103.

The sensor 104 connected to the electronic control unit 100 is a distance measurement sensor that detects data indicating the state of the vehicle (corresponding to vehicle data), for example, the inter-vehicle distance between the front vehicle and the host vehicle. Here, in the first embodiment, when the brake request is generated as the prediction data, the actual inter-vehicle distance R between the front vehicle and the host vehicle stored in the data frame storage 11 is read and used. In the case that the distance measurement sensor is provided as in the second embodiment, the data frame stored in the data frame storage 11 is not read out, but the data of the inter-vehicle distance R is received from the sensor 104. The received data may be compared with the predicted braking distance R0 obtained by Expression (7). Of course, the sensor to which the electronic control unit 100 is connected is not limited to the distance measurement sensor according to the above example, and can be connected to any sensor.

According to the second embodiment, the electronic control unit 100 can directly acquire data from the sensor and generate a prediction data. Suppose a case that an appropriate number of data frames for generating the prediction data is not stored in the data frame storage 11, for instance, a case that the number of data frames sufficient to generate the prediction data is not stored in the data frame storage 11 immediately after the vehicle is started. Even in such cases, by using the data obtained directly from the sensor together, the electronic control unit 100 can generate the prediction data. Furthermore, the electronic control unit 100 acquires data directly from the sensor. By doing so, it is possible to generate a prediction data using the latest data. Therefore, it is possible to improve the certainty of the prediction data, and it is possible to appropriately control the transmission-destination electronic control unit by using the latest data.

Third Embodiment

The above-described first embodiment has described the configuration in which the prediction data generation unit 14 generates the prediction data whenever the data frame is abnormal. However, the prediction data generation unit 14 may be configured to generate the prediction data only when a specific condition is satisfied even when there is an abnormality in the data frame.

Figure 10:
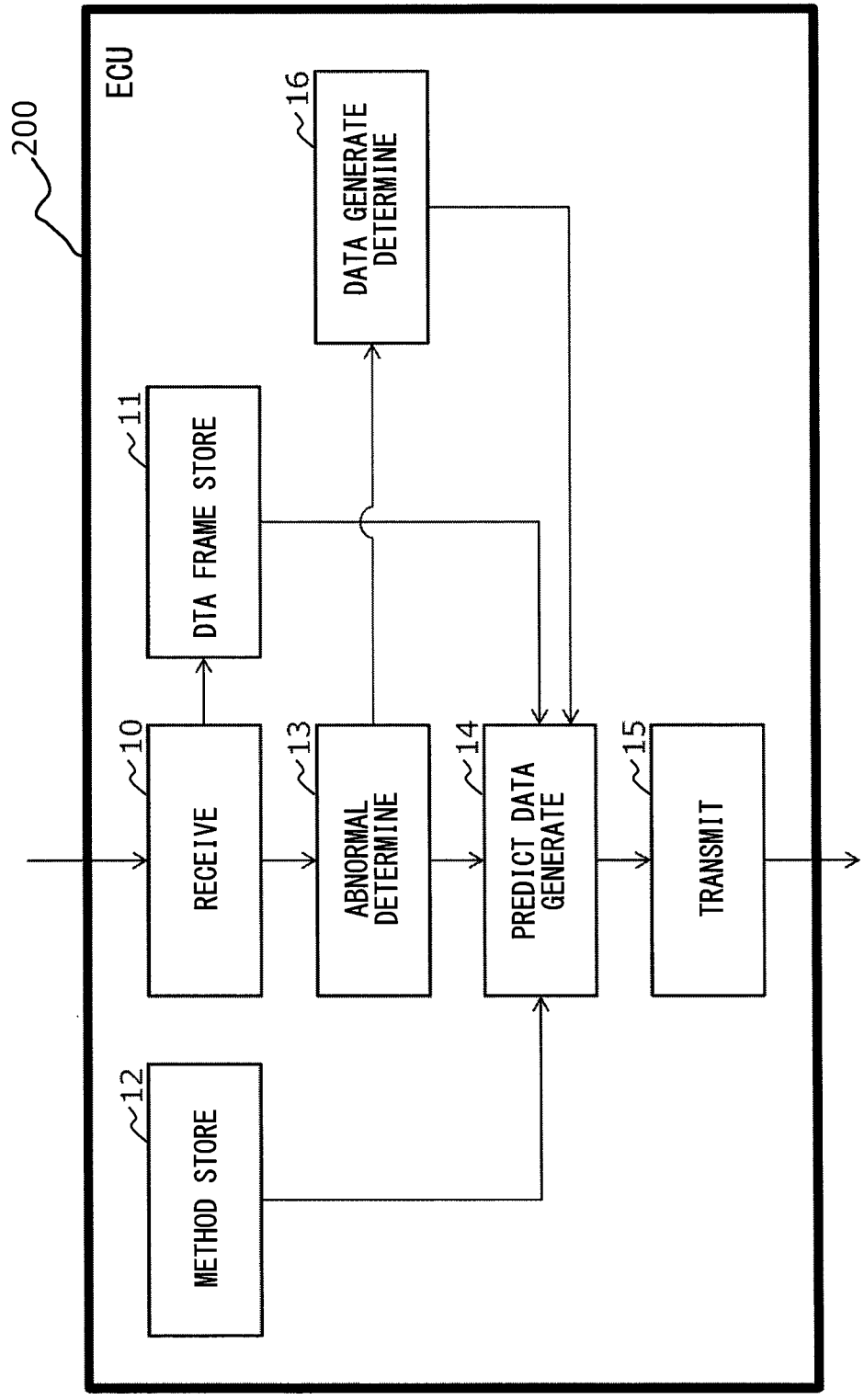
FIG. 10 is a block diagram illustrating a configuration of an electronic control unit according to a third embodiment.

FIG. 10 shows an electronic control unit 200 according to a third embodiment. The same elements as those of the electronic control unit 100 shown in FIG. 2 are designated by the same reference signs, and the description thereof will be omitted. The electronic control unit 200 shown in FIG. 10 includes a data generation determination unit 16 in addition to the elements shown in FIG. 2.

When the abnormality determination unit 13 determines that the data frame is abnormal, the data generation determination unit 16 (corresponding to the determination unit) determines whether the prediction data generation unit 14 needs to generate the prediction data. The determination result is then notified to the prediction data generation unit 14. Then, when the determination result notified from the data generation determination unit 16 indicates that the prediction data needs to be generated, the prediction data generation unit 14 generates the prediction data based on the above-described embodiment.

In a first example, the data generation determination unit 16 determines execution of generation of prediction data only when the type of data included in the data frame determined to be abnormal is a preset data type. For example, data such as vehicle speed, engine speed, and steering angle are data that are directly related to the running of the vehicle and affect the safety of the vehicle. Therefore, in order to realize safe running of the vehicle, it is desirable to prevent the electronic control unit from being controlled by the unauthorized data frame when the data frame including such data is incorrectly transmitted.

Therefore, specific data such as data related to vehicle safety is previously set. When the type of data included in the data frame determined to be abnormal and the set data type are the same, the data generation determination unit 16 determines to generate a prediction data.

In a second example, the data generation determination unit 16 obtains a difference between (i) a data included in the data frame determined to be abnormal and (ii) the latest data of the same type as that of the data included in the data frame determined to be abnormal among the data frames stored in the data frame storage 11. The data generation determination unit 16 may determine whether to generate prediction data based on the obtained difference.

For example, the data generation determination unit 16 compares the difference between the abnormal data and the latest data with a preset allowable difference. When the difference is equal to or larger than the allowable difference, it is determined that the prediction data is to be generated. Specifically, suppose a case where when the allowable difference of the data regarding the vehicle speed is set to 5 km/h, the abnormal data indicates the vehicle speed of 65 km/h and the latest data stored in the data frame storage 11 indicates a vehicle speed of 50 km/h. In this case, the difference between the abnormal data and the latest data is 15 km/h is equal to or more than the allowable difference. Therefore, the data generation determination unit 16 determines to generate the prediction data and notifies the prediction data generation unit 14 of the determination result. On the other hand, suppose a case where the abnormal data indicates the vehicle speed of 52 km/h, and the latest data stored in the data frame storage 11 indicates the vehicle speed of 50 km/h. In this case, the difference between the abnormal data and the latest data is 2 km/h, is less than or equal to the allowable difference. Therefore, the data generation determination unit 16 determines not to generate a prediction data and notifies the prediction data generation unit 14 of the determination result.

There is a case where the data frame determined to be abnormal includes multiple signal segments. In such a case, only the abnormal data stored in a specific signal segment (for example, the signal segment A) may be compared with the latest data stored in the data frame storage 11 and the allowable difference. In this case, the data generation determination unit 16 does not consider an abnormal data stored in the signal segment (for example, the signal segment B) other than the signal segment A in the determination of whether to generate the prediction data.

In a third example, the data generation determination unit 16 may further monitor the load of the communication network 101 and determine whether to generate a prediction data based on the load of the communication network 101.

When the prediction data is generated in the electronic control unit 100 of this embodiment, the load of the communication network 101 increases by transmitting the prediction data frame including the generated prediction data. Therefore, when the load on the communication network 101 is high, transmitting the predicted data frame may hinder transmission/reception of a more important data frame. Therefore, the data generation determination unit 16 compares, for example, the load of the communication network 101 with a preset threshold value of the load of the communication network. When the load of the communication network 101 is lower than the threshold value, it is determined that the predicted data is generated. In contrast, when the load of the communication network 101 is higher than the threshold value, it is determined that the predicted data is not generated. The above determination results are notified to the prediction data generation unit 14.

In a fourth example, the data generation determination unit 16 further monitors the "reception frequency" at which the receiver 10 receives the data frame determined to be abnormal. It may be determined whether to generate a prediction data based on the reception frequency. Here, the "reception frequency" includes the number of times or an interval. That is, the number of times includes the number of times an abnormal data frame was received within a certain period, or the number of times an abnormal data frame was received in succession. The interval includes a reception interval of abnormal data frames.

For example, suppose a case where multiple data frames that have been determined to be abnormal are received in succession. In such a case, the prediction data generation unit 14 does not generate a prediction data for all the data frames determined to be abnormal, but generates a prediction data for every fixed number of received multiple data frames, or for every fixed time. The prediction data frame including the generated prediction data may be transmitted from the transmitter 15.

The transmission-destination electronic control unit 103 reads out the latest data frame from the received data frames by LIFO control, and controls based on the data included in the latest data frame. That is, even if the electronic control unit 100 transmits a plurality of prediction data frames including a prediction data, the transmission-destination electronic control unit 103 uses only the latest prediction data frame, and invalidates other prediction data frames. As described above, the electronic control unit 100 transmits the predicted data frame that is not used by the transmission-destination electronic control unit 103, thereby increasing the load on the communication network 101. Therefore, transmission and reception of more important data frames may be hindered. In particular, if the abnormal data frames are continuously received and the predicted data frames are continuously transmitted accordingly, the load on the communication network 101 increases rapidly. Therefore, the data generation determination unit 16 monitors and counts the number of times a data frame having an abnormality is received within a certain period or continuously. At the same time, the counted number of times of reception is compared with a preset threshold number of times. Then, when the counted number of times of reception is higher than the threshold number of times, it is determined that the predicted data will not be generated for a certain number of times or for a certain period of time. On the other hand, when a certain number of times or a certain period of time has elapsed, it is determined that the prediction data will be generated. The determination result is thereby notified to the prediction data generation unit 14. In addition, the threshold number of times or the time serving as a criterion for determining whether to generate the prediction data may be different depending on the type of data.

(Overview)

The electronic control unit and the electronic control system in each embodiment have been described above.

The terms used in the above embodiments are mere examples, and may be replaced with terms having the same meaning or terms having the same functions.

The block diagrams used in the description of the embodiments are a diagram in which the elements of the electronic control unit and the like are classified and organized by functions. These functional blocks are realized by any combination of hardware or software. Further, since the functions are shown, the block diagram can be understood as the disclosure of the method.

The order of the functional blocks that can be grasped as the process, sequence, and method described in each embodiment may be changed unless there is a constraint such that the result of another step is used in one step.

Each of the embodiments is premised on an electronic control unit and an electronic control system for a vehicle mounted on the vehicle. However, this description also discloses an information processing system including a special-purpose or general-purpose electronic control system other than that for a vehicle, and an information processing device including a special-purpose or general-purpose electronic control unit.

Examples of the electronic control unit according to the present disclosure include a semiconductor device, an electronic circuit, a module, and a microcomputer. In addition, necessary functions such as an antenna and a communication interface may be added to these devices. Moreover, it may be also possible to provide features such as a car navigation system, a smartphone, a personal computer, and a portable information terminal.

In addition, the present disclosure can be realized by special-purpose hardware having the configuration and function described in each embodiment. In addition, it can be realized as a combination of a program for realizing the present disclosure stored in a storage medium such as a memory or a hard disk, and a general-purpose hardware having a special-purpose or general-purpose CPU and memory capable of executing the program.

The program may be stored in a special-purpose or general-purpose hardware storage medium (external storage device (hard disk, USB memory, CD/BD, etc.), an internal storage (RAM, ROM, etc.), or a non-transitory tangible storage medium. Such a program may be provided to special-purpose or general-purpose hardware via a storage medium or via a communication line from a server without using the storage medium. Consequently, when the program is upgraded, the latest function is always provided.

INDUSTRIAL APPLICABILITY

The electronic control unit of the present disclosure has been described mainly as a vehicular electronic control unit mounted in an automobile. However, the electronic control unit of the present disclosure can be applied to general moving objects such as motorcycles, bicycles with electric motors, railroads, ships, and aircraft.

For reference to further explain features of the present disclosure, the description is added as follows.

In recent years, various types of electronic control units, which are connected to each other via an in-vehicle network such as a CAN (Controller Area Network), are mounted on an automobile. These electronic control units include electronic control units that control the operation of the vehicle, such as the engine and steering wheel. Therefore, in order to ensure the safety of the vehicle, high security is required to prevent the electronic control unit from being incorrectly controlled by an unauthorized access by a third party, or to invalidate the unauthorized control performed by a third party.

There is a frame monitoring apparatus as follows. When an unauthorized frame is transmitted/received in an in-vehicle system, a cancellation frame for invalidating the unauthorized frame is transmitted by using LIFO (Last In First Out) control; the electronic control unit is thus prevented from being controlled by the unauthorized frame. Further, when the frame monitoring apparatus determines that the transmitted/received frame is an unauthorized frame, it transmits a frame having the same content as a regular frame received immediately before the unauthorized frame as a cancellation frame.

According to the described technique, the electronic control unit, which is the transmission-destination of the frame, is controlled based on the control information included in the cancellation frame received after the unauthorized frame. The electronic control unit can thus be prevented from being controlled by the unauthorized frame. By the way, there is a time lag from the transmission of the regular frame immediately before the unauthorized frame to the transmission of the unauthorized frame or the cancellation frame. When a frame having the same content as the immediately preceding regular frame is used as the cancellation frame, the change in vehicle condition over time that may occur due to such a time lag may be not considered. Therefore, the inventors have found that it may not be appropriate to use the control information included in the immediately preceding regular frame as the control information included in the cancellation frame.

It is thus desired to predict a normal data that should be included in a data frame, and invalidate an unauthorized frame using a frame that includes the predicted normal data (i.e., a prediction data).

Aspects of the present disclosure described herein are set forth in the following clauses.

According to a first aspect of the present disclosure, an electronic control unit is provided to include a receiver, a first storage, a second storage, an abnormality determination unit, a prediction data generation unit, and a transmitter. The receiver is configured to receive a data frame transmitted from a different electronic control unit via a communication network. The first storage is configured to store the data frame. The second storage is configured to store a prediction generation method to predict and generate a data included in the data frame. The abnormality determination unit is configured to determine whether the data frame is abnormal. The prediction data generation unit is configured to generate a prediction data, which is predicted to be a normal data that is supposed to be included in the data frame that is determined to be abnormal, by using a past data that is a data included in the data frame stored in the first storage, based on the prediction generation method stored in the second storage. The transmitter is configured to transmit a prediction data frame including the prediction data via the communication network.

According to a second aspect of the present disclosure, an electronic control system is provided to include a first electronic control unit, a second electronic control unit, and a third electronic control unit.

The first electronic control unit is configured to transmit a data frame via a communication network.

The second electronic control unit is configured to include a receiver, a first storage, a second storage, an abnormality determination unit, a prediction data generation unit, and a transmitter. The receiver is configured to receive a data frame transmitted from a different electronic control unit via a communication network. The first storage is configured to store the data frame. The second storage is configured to store a prediction generation method to predict and generate a data included in the data frame. The abnormality determination unit is configured to determine whether the data frame is abnormal. The prediction data generation unit is configured to generate a prediction data, which is predicted to be a normal data that is supposed to be included in the data frame that is determined to be abnormal, by using a past data that is a data included in the data frame stored in the first storage, based on the prediction generation method stored in the second storage. The transmitter is configured to transmit a prediction data frame including the prediction data via the communication network.

The third electronic control unit is configured to receive the data frame transmitted from the first electronic control unit and the prediction data frame transmitted from the second electronic control unit; the third electronic control unit is configured to perform a control based on the prediction data frame.

According to a third aspect of the present disclosure, a prediction data generation program is provided as follows: receiving a data frame transmitted from a different electronic control unit via a communication network; storing the data frame in a first storage; determine whether the data frame is abnormal; generating a prediction data, which is predicted to be a normal data that is supposed to be included in the data frame that is determined to be abnormal, by using a past data that is a data included in the data frame stored in the first storage, based on a prediction generation method stored in a second storage; and transmitting a prediction data frame including the prediction data via the communication network.

According to a fourth aspect of the present disclosure, a prediction data generation method is provided as follows: receiving a data frame transmitted from a different electronic control unit via a communication network; storing the data frame in a first storage; determine whether the data frame is abnormal; generating a prediction data, which is predicted to be a normal data that is supposed to be included in the data frame that is determined to be abnormal, by using a past data that is a data included in the data frame stored in the first storage, based on a prediction generation method stored in a second storage; and transmitting a prediction data frame including the prediction data via the communication network.

Effects

According to the electronic control unit, the electronic control system, the prediction data generation program, and the prediction data generation method of the present disclosure, it is possible to invalidate an unauthorized frame by using a frame including data having appropriate content.

What is claimed is:
1. An electronic control unit comprising:
a receiver configured to receive a data frame transmitted from a different electronic control unit via a communication network;
a first storage configured to store the data frame;
a second storage configured to store a plurality of prediction generation methods to predict and generate a data included in the data frame;
an abnormality determination unit configured to determine whether the data frame is abnormal;
a prediction data generation unit configured to
select one prediction generation method from the plurality of prediction generation methods stored in the second storage based on a type of an abnormal data that is a data included in the data frame that is determined to be abnormal, and
generate a prediction data, which is predicted to be a normal data that is supposed to be included in the data frame that is determined to be abnormal, by using a past data that is a data included in the data frame stored in the first storage, based on the selected one prediction generation method; and
a transmitter configured to transmit a prediction data frame including the prediction data via the communication network.

2. The electronic control unit according to claim 1, wherein:
the transmitter is configured to transmit the prediction data frame at a predetermined transmission time after the prediction data is generated; and
the prediction data generation unit is configured to generate, as the prediction data, a normal data that is supposed to be included in the data frame determined to be abnormal under an assumption that the data frame determined to be abnormal is transmitted at the predetermined transmission time.

3. The electronic control unit according to claim 2, wherein:
the prediction data generation unit is configured to further generate the prediction data using the predetermined transmission time.

4. The electronic control unit according to claim 1, wherein:
the prediction data generation unit is configured to generate the prediction data predicted from the past data with a type identical to a type of the abnormal data included in the data frame determined to be abnormal.

5. The electronic control unit according to claim 1, wherein:
the electronic control unit is mounted on a vehicle and is connected to a sensor configured to detect a vehicle data indicating a state of the vehicle; and
the prediction data generation unit is configured to further generate the prediction data using the vehicle data detected by the sensor.

6. The electronic control unit according to claim 1, further comprising:
a determination unit configured to determine whether to generate the prediction data based on a type of the abnormal data included in the data frame determined to be abnormal.

7. The electronic control unit according to claim 1, further comprising:
a determination unit configured to determine whether to generate the prediction data based on a difference between the abnormal data included in the data frame determined to be abnormal and a latest data of the past data with a type identical to a type of the abnormal data.

8. The electronic control unit according to claim 1, further comprising:
a determination unit configured to
monitor a load of the communication network, and
determine whether to generate the prediction data based on the load.

9. The electronic control unit according to claim 1, further comprising:
a determination unit configured to
monitor a reception frequency of the data frame determined to be abnormal and
determine whether to generate the prediction data based on the reception frequency.

10. An electronic control unit comprising:
a receiver configured to receive a data frame transmitted from a different electronic control unit via a communication network;
a first storage configured to store the data frame;
a second storage configured to store a prediction generation method to predict and generate a data included in the data frame;
an abnormality determination unit configured to determine whether the data frame is abnormal;
a prediction data generation unit configured to generate a prediction data predicted to be a normal data that is supposed to be included in the data frame determined to be abnormal, based on the prediction generation method, by using a past data that is a data included in the data frame stored in the first storage, the past data having a type different from a type of an abnormal data that is a data included in the data frame determined to be abnormal; and
a transmitter configured to transmit a prediction data frame including the prediction data via the communication network.

11. The electronic control unit according to claim 10, wherein:
the transmitter is configured to transmit the prediction data frame at a predetermined transmission time after the prediction data is generated; and
the prediction data generation unit is configured to generate, as the prediction data, a normal data that is supposed to be included in the data frame determined to be abnormal under an assumption that the data frame determined to be abnormal is transmitted at the predetermined transmission time.

12. The electronic control unit according to claim 11, wherein:
the prediction data generation unit is configured to further generate the prediction data using the predetermined transmission time.

13. The electronic control unit according to claim 10, wherein:
the prediction data generation unit is configured to generate the prediction data predicted from the past data with a type identical to a type of the abnormal data included in the data frame determined to be abnormal.

14. The electronic control unit according to claim 10, wherein:
the electronic control unit is mounted on a vehicle and is connected to a sensor configured to detect a vehicle data indicating a state of the vehicle; and
the prediction data generation unit is configured to further generate the prediction data using the vehicle data.

15. The electronic control unit according to claim 10, further comprising:
a determination unit configured to determine whether to generate the prediction data based on a type of the abnormal data included in the data frame that is determined to be abnormal.

16. The electronic control unit according to claim 10, further comprising:
a determination unit configured to determine whether to generate the prediction data based on a difference between the abnormal data included in the data frame determined to be abnormal and a latest data of the past data with a type identical to a type of the abnormal data.

17. The electronic control unit according to claim 10, further comprising:
a determination unit configured to
monitor a load of the communication network and
determine whether to generate the prediction data based on the load.

18. The electronic control unit according to claim 10, further comprising:
a determination unit configured to
monitor a reception frequency of the data frame determined to be abnormal and
determine whether to generate the prediction data based on the reception frequency.

19. An electronic control system comprising:
a first electronic control unit configured to transmit a data frame via a communication network;
a second electronic control unit comprising
a receiver configured to receive the data frame,
a first storage configured to store the data frame,
a second storage configured to storing a plurality of prediction generation methods to predict and generate a data included in the data frame,
an abnormality determination unit configured to determine whether the data frame is abnormal,
a prediction data generation unit configured to
select one prediction generation method from the plurality of prediction generation methods stored in the second storage based on a type of an abnormal data that is a data included in the data frame that is determined to be abnormal, and
generate a prediction data, which is predicted to be a normal data that is supposed to be included in the data frame that is determined to be abnormal, by using a past data that is a data included in the data frame stored in the first storage, based on the selected one prediction generation method, and a transmitter configured to transmit a prediction data frame including the prediction data via the communication network; and a third electronic control unit configured to receive the data frame transmitted from the first electronic control unit and the prediction data frame transmitted from the second electronic control unit, the third electronic control unit being configured to perform a control based on the prediction data frame.

20. The electronic control system according to claim 19, further comprising:

a sensor connected to the second electronic control unit, wherein:

the electronic control system is mounted on a vehicle;

the sensor is configured to detect a vehicle data indicating a state of the vehicle; and the prediction data generation unit is configured to generate the prediction data using the vehicle data detected by the sensor.

21. A computer-implemented prediction data generation method executed by a computer, comprising:

receiving a data frame transmitted from a different electronic control unit via a communication network;

storing the data frame in a first storage;

determining whether the data frame is abnormal;

selecting one prediction generation method from a plurality of prediction generation methods stored in a second storage based on a type of an abnormal data that is a data included in the data frame that is determined to be abnormal;

generating a prediction data, which is predicted to be a normal data that is supposed to be included in the data frame that is determined to be abnormal, by using a past data that is a data included in the data frame stored in the first storage, based on the selected one prediction generation method; and transmitting a prediction data frame including the prediction data via the communication network.

22. A non-transitory computer-readable storage medium comprising a prediction data generation program including instructions executable by a computer, the instructions including the computer-implemented prediction data generation method according to claim 21.

23. The electronic control unit according to claim 1, further comprising:

one or more than one processor coupled to the receiver, the first storage, the second storage, and the transmitter via a communication link, the processor implementing the abnormality determination unit and the prediction data generation unit.

* * * * *